Aug. 15, 1944.    G. E. BARKER    2,355,616
LUBRICANT
Filed Dec. 28, 1940
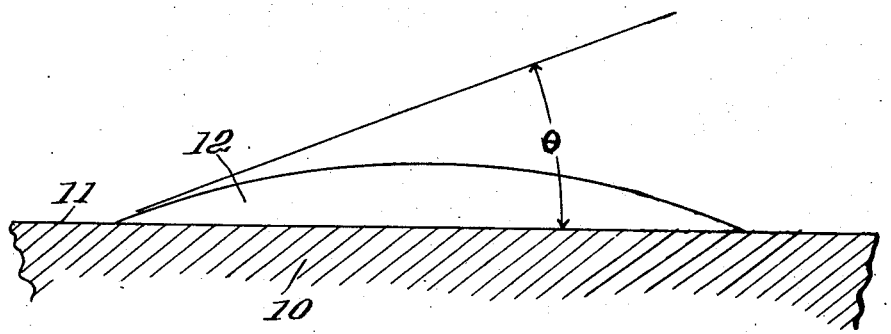
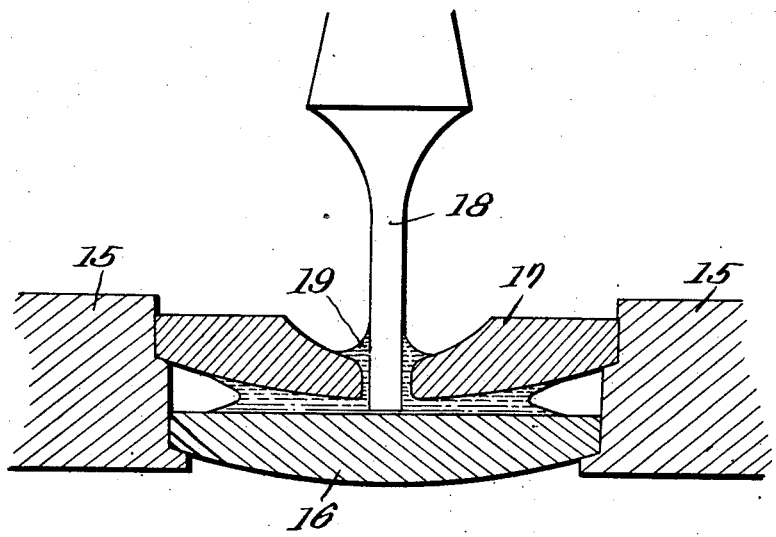
INVENTOR
George E. Barker Patented Aug. 15, 1944

2,355,616

UNITED STATES PATENT OFFICE 2,355,616

LUBRICANT

George E. Barker, Pittsburgh, Pa., assignor to Elgin National Watch Company, Elgin, Ill., a corporation of Illinois Application December 28, 1940, Serial No. 372,136

21 Claims. (Cl. 252—52)

This invention relates to the art of lubricating bearings, and is particularly valuable in conjunction with watches, clocks, meters, scientific apparatus and other mechanisms which require a lubricant that will remain effective under conditions where a continued delivery of lubricating agent cannot be readily effected or permitted.

The lubrication of instruments of precision of this nature presents a special problem, as usually they must be enclosed and sealed, and the mechanisms are normally inspected or supplied only once in one or more years. Consequently, a satisfactory lubricant for such instruments must remain in position on the bearing to which it is applied and must not spread to other parts of the mechanism and thus leave the pivot dry or unlubricated. It is also essential that a lubricant to be used for such a purpose should possess a vanishingly small volatility within the normal operating range of temperatures, and a low temperature of solidification, as the instruments must remain effective over a wide temperature range without disturbance to their calibration. A suitable low viscosity and a high viscosity index is desirable, and by preference the coefficient of friction should be below 0.1040 for the smaller watches and instruments where the available power supply is low. Since such a lubricant is exposed to air for a long period of time, it must not oxidize, become rancid, nor form gum under ordinary atmospheric conditions or in the presence of the operating parts to which it is applied; and in general must retain chemical stability over a period of years. Furthermore, the lubricant must not be corrosive nor become corrosive to the parts with which it may be in contact during the period of use.

A similar problem in lubrication is presented when the mechanism is employed under such conditions that there must be no escape of lubricant from the bearing to surfaces of adjacent parts as in textile and food machinery, in order to avoid the attendant difficulties of soiling such parts or causing a rapid collection of air-borne impurities, which of themselves usually provoke a further spreading.

Mineral oils spread too rapidly, leaving the bearing surfaces dry within a short period of time. Acid-free animal and vegetable oils generally spread too rapidly, and are subject to oxidation and rancidification during use. Among the natural oils, that which is obtained by rendering certain fats from the head of the porpoise has been found to possess many of the properties desired, and it has found extensive use in the lubrication of watches and fine mechanisms for many years; but has the disadvantage of nonuniformity, a tendency to become rancid and corrosive, and an undesirably-great tendency to spread in some of the smaller and more delicate instruments which are in common use today.

It is not feasible in most instances to provide a continuous delivery of lubricant, because there is no power available to operate a satisfactory lubricating pump; and, as the excess of lubricant must be disposed of in some fashion, sealing devices, packings, sumps and return ducts are then usually demanded with their attendant difficulties of maintenance and increasing the power demand upon the moving parts. Furthermore, such systems often give trouble with instruments which are of portable nature or which may be frequently shifted or even turned upside-down during employment.

While the invention is particularly appropriate for employment in cases where "boundary lubrication" is demanded, it can also be employed in instances where higher speeds of parts occur. By boundary lubrication is meant the condition of parts wherein the rate or nature of the relative movement does not permit the establishment of a uniform maintained film of major thickness.

According to this invention, substances are employed as lubricants which are characterized by their low tendencies to spread on surfaces. This is in strict opposition to the efforts presently made, with many lubricants, to increase their "wetting" capacity when in contact with such surfaces, so that they will creep therealong. It has been found that substances which are valuable under the present conditions are classifiable as having a non-ionic negative group, and most of them are intermediately polar compounds with covalent bonds; and it appears that the contact angle of a small drop of liquid with a horizontal solid surface is a function of the number, position, and nature of polar groups in the molecule.

From the behavior of the materials, it appears that they are adsorbed on the surface, and a film of one or more molecules thickness is effectively established for producing the desired effects of maintaining the high contact angle. Theoretically, a polar negative group becomes attached to the surface under the action of a force which may be denominated adhesion tension, with the other groups extended from the polar negative group in a general direction away from the surface, with the precise location of such other groups dependent largely upon the internal structure of the molecules. Two such surfaces do not come in a direct contact with one another, when such films are established thereon, and a relative slipping between the two superficial layers, under the conditions of boundary lubrication, forms the lubricating effect which thus differs from the action of a maintained liquid intermediate film in high speed lubrication.

When measurements are made under conditions for obtaining reproducible and comparable results, following definite routines of cleaning, polishing, washing and drying of surfaces, the "contact angle" may be measured directly, usually under the microscope, and is found to permit determination of whether a particular substance is available for employment as a non-spreading lubricant. It is preferred to conduct these measurements upon the materials which are normally employed for bearings of this nature, and hence the following tables are stated with respect to the contact angle as presented by a small drop of the lubricant on the brass, steel and ruby surfaces. These materials are selected for the test, as they are the normal materials of construction of delicate instruments. Sapphire surfaces behave about the same as those of ruby. Surfaces of gold alloy and nickel usually have a contact angle somewhat greater than that of steel. It will be understood that the lubricants also display their effects upon other materials.

In the accompanying drawing:

Figure 1 is a diagram showing the behavior of a sessile drop in contact with a horizontal surface.

Figure 2 is a cross-sectional view through a balance jewel bearing of the watch illustrating the position assumed by the oil.

In this drawing, Fig. 1 indicates the manner of testing a particular substance for its contact angle. A body 10 is prepared with a plane surface 11, which is accurately positioned to be horizontal, and a drop 12 of the substance is placed on the surface. This sessile drop then positions itself, and its shape is determined: The angle θ is then the contact angle for this substance upon the particular material.

In determinations of the comparative behavior of particular compositions, it is preferred to employ the same sample of the solid material, with proper cleaning and polishing before each test. For the tests herein reported, the sample of steel was a piece of high carbon steel (Halcomb drill rod, 1.00 to 1.15 percent carbon); the sample of brass was ordinary cold rolled brass rod or leaded brass (copper, 60 to 63 percent, lead 2 to 4 percent, iron (max.) 0.15 percent, impurities (max.) 0.50 percent, zinc, balance); and a synthetic ruby slab was used for the jewel surface. The metal surfaces were prepared by rough polishing with metallographic emery papers No. 00, 000 and 0000, and were given a final finish with Fisher's polishing alumina No. 2 on broadcloth. The jewel surface was cleaned and restored with rouge.

Preparatory to each test of the surfaces, any contaminating liquid was removed by a suitable solvent such as alcohol, acetone, benzene, etc. The metal surfaces were polished with polishing alumina No. 2, while ruby surfaces were restored with rouge. The surfaces were washed with tap water, swabbed with cotton to remove all polishing abrasive, and washed with a copious amount of distilled water. Each sample was rinsed with 95 percent alcohol and dried for thirty minutes at 100 to 105 degrees C.: Omission of the alcohol rinse may cause the highly polished steel surface to rust. The specimens were allowed to cool in a desiccator containing calcium chloride and calcium oxide. The surfaces were used the same day on which they were prepared.

For measuring the contact angle, a microscope was mounted with its tube in a horizontal position, and fitted with 32 mm. objective and a filar micrometer eyepiece. The surface of the sample was mounted on a mechanical stage and in the field of the microscope. A drop of the liquid (approximately 0.18 cu. mm.) was placed upon the surface, and the latter manipulated by the mechanical stage so that the height and chord of the drop, thus viewed in profile, could be measured. The assumption was made that the shape of the upper surface of the drop is spherical: This is closely correct for a drop of the size stated, with materials having satisfactory coefficients of viscosity, and in fact major departures from spherical shape appear only to occur with materials which spread excessively for present employment. The height and chord of the drop being known, the contact angle θ may be calculated directly.

In Fig. 2 is shown illustratively a balance jewel assembly for a watch having a plate 15 for receiving the end stone 16 which provides a thrust bearing, and the olive jewel 17 which provides the radial bearing. The balance pivot 18 is thus supported against radial displacement by the jewel 17 and against axial displacement by the end stone 16. The lubricant 19 is introduced into such a jewel assembly in the proper quantity, care being taken to cause the contact only at or adjacent the points of bearing engagement between the pivot and the jewel. Owing to possible air-locking, and to the nature of the contact angle, capillarity does not immediately "pull" the lubricant into the interstices, but an acceptance occurs upon working to force the lubricant and displace the air, so that the lubricant assumes the general position shown in Fig. 2.

The stone and jewel of this capped jewel bearing are shown as being retained in position in the plate 15 by frictional effects, as an illustration of one of the many ways in which the parts are presently assembled.

The contact angle as shown in Fig. 1 is thus between zero and 90 degrees, and it is desirable to maintain this angle greater than 10 degrees by proper selection of the material employed. This angle is to be distinguished from the behavior of a liquid such as mercury upon a non-amalgamated surface in which the contact angle is negative or re-entrant, and would amount to more than 90 degrees under the conditions of Fig. 1. Such re-entrant angles have the difficulty of creating a crevice between surfaces of a solid and a liquid, into which moisture can penetrate and establish a deposit near a supporting point or bearing, usually with the production of corrosion.

Some of the polar groups which tend to decrease spreading are the amide, nitro, nitrile, sulphonic, hydroxyl, carboxyl, phenyl, oxy, halide. The number of these polar groups, and their positions in the molecule, determine the contact angle, and thus operate to control the spreading. For example, a single strongly negative group such as the carboxyl ($\cdot$COOH) group is sufficient to prevent the spreading of a large molecule as in the case of oleic acid. With a very weakly negative group, such as the phenyl ($\cdot C_6H_5$) group, at least two are usually required and the contact angles are the higher if these are situated near opposite extremities of the molecule.

For purposes of illustration and comparison, the following table sets out values of the contact angles of a variety of liquids upon brass, steel and ruby surfaces. The higher the contact angle, the greater the resistance to spreading.

*Contact angles of liquids on horizontal surfaces*

| Liquid | Surfaces | | |
|---|---|---|---|
| | Brass | Steel | Ruby |
| | Degrees | Degrees | Degrees |
| Porpoise jaw oil | 4 | 4 | 2 |
| High grade mineral oil (viscosity—100 secs. Saybolt at 100° F.)[1] | 0 | 0 | 0 |
| A commercial watch oil (widely used brand) | 3 | 3 | 10 |
| Phenyl ether of diethylene glycol | 56 | 36 | 34 |
| Phenyl ether of tripropylene glycol | 39 | 26 | 35 |
| Benzyl ether of diethylene glycol | 26 | 13 | 31 |
| Cyclohexyl ether of diethylene glycol | 7 | 0 | 11 |
| Diphenyl methane | 30 | 21 | 29 |
| Monoamylnaphthalene | 27 | 7 | 26 |
| Diamylnaphthalene | 13 | 0 | 26 |
| Dodecyl naphthalene | 28 | 17 | 23 |
| Ethylated diphenyl (B. P.=305–310° C.) | 29 | 21 | 30 |
| Tetraline (tetrahydronaphthalene) | 15 | 11 | 26 |
| β-phenyl ethyl alcohol | 45 | 36 | 41 |
| Benzyl butyl phthalate | 47 | 28 | 35 |
| Dibutyl phthalate | 35 | 0 | 32 |
| Benzyl β-ethoxy-ethyl phthalate | 54 | 35 | 42 |
| o-Benzylphenyl n-amyl ether | 29 | 23 | 25 |
| o-Benzylphenyl benzyl ether | 53 | 30 | 39 |
| n-Amyldiphenylmethane | 27 | 17 | 15 |
| Polyamyl diphenyls | 19 | 11 | 25 |
| o-Benzylphenyl dodecyl ether | 32 | 27 | 37 |
| Benzyl phenylundecylate | 28 | 27 | 33 |
| 1,1-diphenyldodecanol-1 | 30 | 22 | 26 |
| Phenylundecanol-1 | 41 | 19 | 33 |
| Benzyl phenoxyphenylundecylate | 41 | 31 | 20 |
| n-Butyl phenoxyphenylundecylate | 32 | 17 | 31 |
| Phenyloctadecanol-1 | 27 | 17 | 27 |
| Diphenylheneicosane | 33 | 26 | 31 |
| Phenyloctadecyl phenylundecylate | 29 | 27 | 30 |
| Phenyloctadecyl phenylvalerate | 30 | 18 | 28 |
| Phenoxyphenyl hexadecane | 17 | 17 | 37 |
| Tolyloctadecanol-1 | 21 | 14 | 28 |

[1] The angles of contact were so small that they could not be measured by the technic employed.

For comparison, the following coefficients of friction of steel on sapphire, when lubricated with the specified agents, may be given:

High grade mineral oil _____ 0.1172
A commercial watch oil (widely used brand) _____ 0.1038
Castor oil _____ 0.0693
Neat's-foot oil _____ 0.0828
Phenyloctadecanol-1 _____ 0.0950
Phenoxyphenyloctane _____ 0.1210
Phenyl ether of tripropylene glycol _____ 0.1270

Highly active groups, such as the carboxyl group, may be employed to produce a high contact angle, yet the normal behavior of a carboxyl group is to effect a rapid corrosion of metal surfaces, and hence a lubricant which is to be used in contact with corrodible metal should be selected from the substances which do not lead to such corrosion. For this reason, nitro, amine, nitrile, sulphonic, sulphhydryl, carboxyl and halide groups are usually to be avoided in such preparations, as bulk lubricants are usually employed at least in part in contact with metals. Amines, for example, cause green corrosion on brass. On the other hand, ethers and hydrocarbons containing aromatic groups are generally quite stable to oxidation, but an anti-oxidant may be added without causing any appreciable change in other properties of the lubricant. With other compounds containing oxy groups, such as esters, alcohols, and ketones, it is advisable to add anti-oxidants or corrosion inhibitors; and such should always be present with compositions which tend to absorb water, such as the lower glycol ethers at least.

In testing with a du Noüy tensiometer, it appears that presently preferred compounds have relatively high surface tensions, of the order of at least 35 and usually over 37 dynes per centimeter, as compared with around 32 or 33 for porpoise jaw oil or other like watch oils of corresponding type.

It has been found possible to produce low pour and solidification temperatures by use of suitable mixtures of the active substances: and in some cases, the synthetic preparation of these substances can be so carried out as to produce a mixture of isomers which has a very low solidification temperature. Such mixtures and other mixtures of materials which are inter-soluble and have appropriate melting points are desirable, as there is no essential tendency for separation and the formation of colloids at low temperatures. When the pour point is found high for the particular purpose of employment, a suitable depressant may be added to reduce the pour point, without any appreciable effect on the other properties.

Many of the materials are capable directly of employment, while others which have satisfactory properties of contact angle, resistance to corrosion or degeneration, and desirable temperature values, can be improved by the addition of "oiliness" carriers, and by the inclusion of any substance soluble in the material and effective for increasing the film strength and improving boundary lubrication, provided that such substance does not modify the other properties of the basic ingredients to an undesirable extent. Thus, alcohols of high molecular weight have been found to possess quite satisfactory properties of oiliness, and of ability to increase the oiliness of other materials: and mixtures of isomers of aryl-substituted long-chain alcohols are particularly satisfactory because they do not spread, do not corrode, possess a low solidification temperature, and are chemically stable. It has been found further that some materials which are effective, but have a tendency toward corrosion, may be corrected or compensated by the inclusion in a proper mixture with other substances of the desired properties, so that the mixture has a desirable contact angle, is inhibited against corrosion, etc. It has been found that inhibitors such as those set out herein have no injurious effect upon the contact angle or upon spreading; and most of them produce no measurable effect in the quantities employed.

Most of the compounds set out in the above tabulation are some shade of yellow; but it is feasible to add a small quantity of an appropriate soluble dye and thereby impart any desired color or fluorescence to the lubricant for the purpose of identification, and to add substances such as menthyl salicylate for assisting in the prevention of deterioration of photo-chemical effects.

In use, the surface should be carefully cleaned before application of the lubricant, so that the lubricant can operate directly upon the metal or jewel surface. Proper solvents and cleaning agents are, therefore, employed to insure effective application. An effective commercial cleaning may comprise a washing of the jewels in water rinses, in a degreasing solution, a sodium cyanide dip, a sulfuric acid dip, and alcohol rinses, followed by a centrifugal drying. The pivots are likewise washed in hot soap water baths, benzine rinses, and a sodium cyanide bath, followed by a centrifugal drying. A higher aliphatic alcohol, such as cetyl alcohol, may be used in a final alcohol rinse for the pivots, if desired, for surface protection of non-lubricated parts. The assembly is performed, and the lubricant is inserted.

When the bearing includes jewels which are held in place by shellac, or other cement, it is essential that the lubricant shall not dissolve the cement, in order to avoid any modification of any properties in the lubricant and also to avoid any loosening of the jewel. The lubricants set out in the following examples are free of solvent action upon shellac.

*Example I*

A lubricant for employment in watch jewels, and similar bearings of other instruments, comprises 80 parts of phenoxyphenyl cetane (a mixture of the two isomers 1- and 2-phenoxyphenyl cetane); 20 parts of phenyloctadecanol-1 (a mixture of the isomers 9- and 10-phenyloctadecanol 1); and 0.1 part of a suitable oxidation inhibitor such as hydroquinone or alpha naphthol or a commercial inhibitor such as those known as GX3 (Gulf Oil Company) or Santolube 36. It has a surface tension of about 35.8 dynes per centimeter.

This phenyloctadecanol-1 may be obtained by reacting oleyl acetate with benzene in the presence of anhydrous aluminum chloride, and then saponifying.

*Example II*

A lubricant for a watch escapement, which has a rapid oscillating movement, may be prepared from 100 parts of phenyloctadecyl phenylvalerate (a mixture of four isomers thereof), with 0.1 part of a corrosion inhibitor as above or the commercial product known as Santolube 36 (Monsanto Chemical Company).

This phenyloctadecyl phenylvalerate may be obtained by esterifying the mixture of isomeric alcohols prepared as described in Example I, with the mixture of isomers obtained from the reaction of allylacetic acid with benzene in the presence of anhydrous aluminum chloride, to produce a complex mixture of isomers.

The materials of the Examples I and II are effective to give a high contact angle, are stable against ordinary atmospheric conditions, do not corrode normal metals employed in such instruments, have relatively flat viscosity temperature curves from minus 35 degrees C. to plus 100 degrees C., and may have a viscosity index between 130 and 150.

Other satisfactory compositions for employment for the conditions stated comprise:

*Example III*

The following composition is an excellent watch and fine instrument lubricant:

| | Parts |
|---|---|
| Isomeric diphenylheneicosanes described in Example VII | 80 |
| Isomeric phenyloctadecanols described in Example I | 20 |
| Hydroquinone | 0.1 |

The behavior of this composition is much the same as that of Example I, except at very low temperatures, at which it becomes much more viscous. It has a surface tension of about 37.7 dynes per centimeter.

*Example IV*

100 parts of phenyl ether of tripropylene glycol, 0.5 part of stearic acid, and 0.25 part of a corrosion inhibitor such as Santolube 36, provide a satisfactory light lubricant.

*Example V*

Benzyl butyl phthalate is a non-spreading lubricant for watches, and is particularly valuable when 0.25 part of a corrosion inhibitor has been added to this ester.

*Example VI*

Diphenylheneicosanones may be employed in a non-spreading lubricant as a mixture of the 1-, 2-, 1-20, 1-21, 2-20 ketones. This lubricant has a surface tension of about 38.1 dynes per centimeter.

This mixture of isomeric ketones may be obtained by reacting undecylenic acid with benzene in the presence of anhydrous aluminum chloride to form two isomeric phenylundecylic acids and converting these catalytically to the isomeric ketones set out.

*Example VII*

A non-spreading lubricant is composed of the isomeric diphenylheneicosanes obtained by the reduction of the diphenylheneicosanones described in Example VI. It has a surface tension of about 38.1 dynes per centimeter. This material provides a lubricant for tachometers and like instruments connected to prime movers of ample power output; and this may be given a lower coefficient of friction by introducing, say, 20 parts of a compatible aralkyl alcohol such as that of Example I.

*Example VIII*

A non-spreading watch and fine instrument lubricant is composed of the two isomeric phenoxyphenyl cetanes obtained by the reaction of cetene (hexadecene) with phenyl ether in the presence of anhydrous aluminum chloride. It has a surface tension of about 35.9 dynes per centimeter.

*Example IX*

Dodecyl naphthalene ($C_{12}H_{25} \cdot C_{10}H_7$) has a satisfactory viscosity, contact angle, and coefficient of friction under boundary lubrication conditions; and is effective as a lubricant for watches and instruments.

*Example X*

The phenyloctadecyl phenyl ethers may be employed in a non-spreading lubricant as a mixture of the 9- and 10-phenyl isomers. The cloud temperature is 45 degrees F.; pour and solidification temperatures 40 degrees F. This lubricant is useful at temperatures above 40 degrees F. and under conditions where superior boundary lubricating properties are not required. The impure mixture contains substances which tend to corrode brass and steel, and such should be eliminated, or their effects offset by a corrosion inhibtor.

*Example XI*

A mixture of the 9- and 10-phenyloctadecyl o-phenylphenyl ethers is a non-spreading lubricant in the higher viscosity range. The pour temperature is minus 10 degrees F.; solidification temperature minus 25 degrees F. The presence of phenyl-octadecyl alcohol assists in obtaining a low coefficient of friction.

Example XII o-Benzylphenyl ether is a non-spreading lubricant of low viscosity which is operative only at temperatures above 55 degrees F. (cloud, pour, and solidification temperatures). If a boundary lubricant is required, additives (such as aralkyl alcohols) may be employed to give the desired low coefficient of friction.

Other materials than those set out in the specific examples may be employed. While powerfully polar materials can be utilized where there is no danger of corrosion thereby, and such materials may be introduced into the compounds for increasing the contact angle thereof, it is normally preferred, in preparing a bulk of lubricant for use generally in fine instruments, to avoid the inclusion of materials which are apt to cause corrosion with the normal substances of which such instruments are constructed, or else to employ the highly corrosive materials in extremely small proportions, and to include protective agents of the nature of corrosion inhibitors and anti-oxidants. In general, it is preferred to form the lubricant of materials selected from the chemical groups which are known as hydrocarbons, alcohols, esters, ethers, and ketones, and more particularly those containing aryl groups. The other characteristics for proper service are then determined by a proper selection of the individual ingredients and their admixture. Thus, it is possible to prepare lubricants which are liquid between minus 35 degrees C., and plus 100 degrees C., with a vanishingly small vapor pressure and a low viscosity throughout such operating range of temperature, which are chemically stable over a period of years, are non-spreading and have a high angle of presentation to bearing surfaces of steel, brass, ruby, etc. Likewise, such materials of the preferred grouping are non-corrosive to steel, iron, brass and ruby and other materials of construction both of themselves, and also upon contact with the surfaces in the presence of the atmosphere.

The coefficients of friction and contact angles of the lubricating compositions of the foregoing examples have been noted as follows:

| Liquid | Coefficient of friction (steel on sapphire) | Surfaces | | |
|---|---|---|---|---|
| | | Brass | Steel | Ruby |
| | | Degrees | Degrees | Degrees |
| Example I | 0.1005 | 22 | 21 | 26 |
| Example II | 0.1006 | 30 | 18 | 28 |
| Example III | 0.0980 | 28 | 29 | 32 |
| Example IV | 0.1040 | 37 | 26 | 40 |
| Example V | 0.1105 | 47 | 26 | 35 |
| Example VI | 0.1040 | 45 | 26 | 25 |
| Example VII | 0.1065 | 33 | 26 | 31 |
| Example VIII | 0.1065 | 17 | 17 | 37 |
| Example IX | 0.1055 | 28 | 17 | 23 |
| Example X | 0.1045 | 22 | 28 | 19 |
| Example XI | 0.0980 | 25 | 27 | 31 |
| Example XII | 0.1085 | 32 | 27 | 36 |

Many chemical compounds have been found satisfactory for employment, in having the requisite chemical and physical properties for the particular purpose of use. Without restricting the invention solely thereto, it may be pointed out that highly satisfactory lubricants may be selected from individuals, or mixtures of individuals in the following groups:

*Group I.*—Aryl ethers of glycols of the following structures:

1.  $X \cdot R^1 \cdot O \cdot (HCA^1 \cdot CH_2)_n \cdot OH$ in which $R^1$ indicates a bivalent nuclear radical of type B below; $A^1$ is a hydrogen, methyl or ethyl group; X is hydrogen or an alkyl radical of one to five carbons; and $n$ is two or more, although the viscosity often becomes excessively high when $n$ is greater than 3. A corrosion inhibitor should be employed therewith.

*Group II.*—Esters containing aryl groups and of the following structures:

2.  $(R^2 C_n H_{2n}) \cdot CH_2 \cdot O \cdot CO \cdot CH_2 \cdot (R^3 C_m H_{2m})$ in which the expressions $$(R^2 C_n H_{2n}) \cdot \text{ and } \cdot (R^3 C_m H_{2m})$$

represent aliphatic chains with $n$ or $m$ carbon atoms with an end or side aryl group $R^2$ or $R^3$ connected thereto; $n$ and $m$ each being an integer from 1 to 17, and $R^2$ and $R^3$ each being a monovalent aryl radical of types A, C, D, E or F as set out below; or in which either, but not both, $R^2$ or $R^3$ represents an alkyl compound of 2 to 13 carbon atoms, with a total of at least 15 carbon atoms, and in which the other ($R^3$ or $R^2$) represents a double-nuclear monovalent group such as types D, E or F below.

*Group III.*—Primary alcohols containing aryl groups and of the following structures:

3.  $(R^4 C_n H_{2n}) \cdot CH_2 \cdot OH$ in which the parenthetic expression as before represents an alkyl radical having an end or side aryl radical coupled thereto; and in which $n$ is an integer from 10 to 17, and $R^4$ represents a monovalent nuclear radical of types A, C, D, E or F below.

*Group IV.*—Ketones containing aryl groups and of the following structures:

4.  $(R^5 C_n H_{2n}) \cdot CH_2 \cdot CO \cdot CH_2 \cdot (R^6 C_m H_{2m})$ in which the parenthetic expressions as before represent an alkyl radical having an end or side substitution by an aryl radical; and in which $n$ and $m$ may have any integral value from 4 to 16, and $R^5$ and $R^6$ may be a monovalent aryl group of types A, C, D, E or F below.

5.  $(R^7 C_n H_{2n}) \cdot CH_2 \cdot CO \cdot A^2$ in which as before the end or side substituted aryl group $R^7$ is a monovalent radical of types D, E or F below; while $A^2$ is an alkyl group of $m$ carbon atoms, and in which $n$ may be an integer from 2 to 13 and $m$ an integer from 1 to 8, but in which the sum of $m$ and $n$ preferably does not exceed 18.

*Group V.*—Ethers containing aryl groups and of the following structures:

6.  $(R^8 C_n H_{2n}) \cdot CH_3$ in which $R^8$ is a monovalent aryl group of type E below; and in which $n$ is from 5 to 21.

7.  $R^9 \cdot O \cdot (CH_2)_n \cdot CH_3$ wherein $R^9$ is a monovalent double-nuclear radical of types D, E or F below, and $n$ is an integer from 4 to 11.

8.  $(R^{10} C_n H_{2n}) \cdot CH_2 \cdot O \cdot R^{11}$ in which $R^{10}$ represents a monovalent aryl group of types A, C, D, E or F below; $R^{11}$ represents an aryl group of types A, C, D, E or F below; and $n$ is an integer from 10 to 17.

*Group VI.*—Hydrocarbons containing aryl groups and of the following structures:

9.  $R^{12} \cdot (CH_2)_n \cdot CH_3$ where $n$ is an integer from 4 to 15, and $R^{12}$ is a monovalent aryl group of types D or F below.

10.  $(R^{13} C_n H_{2n}) \cdot (CH_2)_m \cdot R^{14}$ in which $R^{13}$ and $R^{14}$ represent monovalent aryl groups of types A, C, D, E or F below; and in which $m$ and $n$ may be integers from 3 to 15.

In the foregoing formulas, the radicals $R^1$ to $R^{14}$ have been employed to designate types of aryl groups as follows:

(A). Mononuclear, monovalent, ring-attached, such as $C_6H_5\cdot$, $CH_3\cdot C_6H_4\cdot$, $(CH_3)_2{:}C_6H_3\cdot$, $C_2H_5\cdot C_6H_4\cdot$ (B). Mononuclear, bivalent, such as $\cdot C_6H_4\cdot$, $:C_6H_3\cdot CH_3$, $\cdot C_6H_4\cdot CH_2\cdot$ (C). Mononuclear, monovalent, aliphatic-attached, such as $C_6H_5\cdot CH_2\cdot$, $C_6H_5\cdot CH_2\cdot CH_2\cdot$ (D). Double-nuclear, monovalent, ring-attached, hydrocarbon type, such as $C_6H_5\cdot C_6H_4\cdot$, $C_6H_5\cdot CH_2\cdot C_6H_4\cdot$ (E). Double-nuclear, monovalent, ring-attached, ether type, such as $C_6H_5\cdot O\cdot C_6H_4\cdot$, $CH_3\cdot C_6H_4\cdot O\cdot C_6H_4\cdot$ (F). Condensed polynuclear, monovalent, such as $C_{10}H_7\cdot$, $C_{10}H_7\cdot CH_2\cdot$ In these various forms, it will be understood that the number of carbon atoms in a given series of otherwise similar compounds determines the behavior thereof, including the relative melting point and the tendency toward vaporization. Thus, changes from phenyl to naphthyl, phenyl to diphenyl, methyl to dimethyl, or increase in the length of the aliphatic chain such as methyl being substituted by ethyl, tends to decrease the vaporization and to increase the melting point. However, excessive lengths of branch chains should be avoided as they tend to increase the creepage of the material along the surface, denoting a relative lowering of the contact angle.

The expression "aryl" has been employed to designate an aromatic radical, i. e., a group containing at least one benzene nucleus. The term "alkyl" has been employed to designate substantially saturated aliphatic radical, i. e., a group containing chain-connected carbon atoms but not including a benzene nucleus. The term "alcohol" is utilized to define an organic compound in which one or more hydrogen atoms attached to aliphatic carbon atoms have been replaced by a like number of hydroxyl groups, and the term "glycol" is employed to indicate a poly alcohol. The term "aralkyl" is employed to designate a radical having a benzene nucleus and also having an aliphatic grouping connected therewith. In alcohols, esters, and ethers, an oxygen atom is associated with two radicals (hydrogen or organic), and such may be designated as "water-type oxy compounds."

It will be noted that many of the compounds of this listing are obviously unsymmetrical, from which fact the existence of dipole moments may be presumed; but, further, it should be noted that empirical and even normal structural formulas do not describe the distribution of associated atoms in space, and that non-symmetry may follow from steric effects.

Generally, the compounds which have been found effective and are presently preferred may be termed aralkyl esters, alcohols, ketones, ethers and hydrocarbons and have an extensive alkyl chain and include at least one benzene nucleus; and are distinguished physically by having the properties set out above. To assure stability, the compounds should be substantially saturated, that is, the atoms of the molecules thereof should be in such relative numbers and association that they do not readily change position or undergo additions which might cause variance from the desired properties.

It is obvious that the invention is not limited to the illustrated examples or groups of compounds, but that other substances of the requisite and described physical and chemical behavior may be employed within the scope of the appended claims.

I claim:

1. A non-spreading lubricant consisting in major part of a stable aralkyl ether having an aliphatic chain of at least five carbon atoms, and having a benzene nucleus connected to the ether oxygen atom, said ether having a positive contact angle with a steel surface in excess of 10 degrees.

2. A non-spreading lubricant consisting of stable aralkyl molecules including a primary alcohol having an aliphatic chain of at least 10 carbon atoms and having an aryl hydrocarbon radical connected to said chain at other than the alpha position, said alcohol having a positive contact angle with a steel surface in excess of 10 degrees.

3. A non-spreading lubricant consisting essentially of a stable aralkyl ester in which both the alcohol and acid groupings include aliphatic chains extending from the connecting oxygen atom of the ester and each including a benzene nucleus, said alcohol having a positive contact angle with a steel surface in excess of 10 degrees, and also including a corrosion inhibitor.

4. A non-spreading lubricant consisting essentially of a mixture of isomeric phenoxyphenyl cetanes with isomeric phenyloctadecanols.

5. A non-spreading lubricant consisting essentially of a mixture of isomeric diphenyl-heneicosanes with isomeric phenyloctadecanols.

6. A non-spreading lubricant consisting essentially of a stable aralkyl ketone having at least one aliphatic chain extending from the ketone carbon atom, said chain having at least three carbon atoms and having a monovalent aryl radical thereon, said ketone being characterized in having a positive contact angle with a steel surface in excess of 10 degrees.

7. A non-spreading lubricant consisting essentially of a stable aralkyl ketone having two aliphatic chains of at least five carbon atoms each, each of said chains having a monovalent aryl radical thereon, said ketone having a positive contact angle with a steel surface in excess of 10 degrees.

8. A non-spreading lubricant consisting at least in major part of a mixture of stable isomeric aralkyl compounds, each including aliphatic chains of at least five carbon atoms and also at least one benzene nucleus located adjacent an end of the chain, and having a positive contact angle with a steel surface in excess of 10 degrees.

9. A non-spreading lubricant consisting essentially of a mixture of a stable aralkyl hydrocarbon having a long aliphatic chain, a stable water-type oxy aralkyl compound, and a corrosion inhibitor, said mixture having a positive contact angle with a steel surface in excess of 10 degrees, a coefficient of friction below 0.1040, and a surface tension in excess of 35 dynes per centimeter, and being characterized in being stable against ordinary atmospheric conditions, non-corrosive to metals employed in watches and fine instruments, a substantially flat viscosity temperature curve from minus 35 to plus 100 degrees C., and a viscosity index between 130 and 150.

10. A non-spreading liquid lubricant consisting at least in major part of stable aralkyl molecules of unsymmetrical structure and having non-ionic strongly negative groups and the alkyl portions being substantially saturated, each of said molecules including at least one aromatic nucleus and an aliphatic group of at least five carbon atoms of which substantially all are in chain relation to one another, said lubricant being characterized in having a positive contact angle with surfaces of steel, brass and ruby between 10 and 60 degrees and a surface tension above 35 dynes per centimeter, and in having a low vapor tension.

11. A non-spreading lubricant consisting essentially of stable polar aralkyl molecules each comprising an alkyl chain and a nuclear aromatic radical connected to said chain, said molecules each having a strong non-ionic negative group, said lubricant having a positive contact angle with a steel surface in excess of 10 degrees and having a surface tension of at least 35 dynes per centimeter.

12. A non-spreading lubricant consisting essentially of stable polar aralkyl molecules each comprising an alkyl chain of 5 to 21 carbon atoms and a nuclear aromatic radical connected to said chain adjacent an end thereof, said molecules each having another non-ionic negative group besides the nuclear radical, said lubricant having a positive contact angle with a steel surface in excess of 10 degrees and having a surface tension of at least 35 dynes per centimeter.

13. A non-spreading lubricant consisting essentially of polar aralkyl molecules each comprising an alkyl chain and a nuclear aromatic radical connected to said chain, said molecules each having a strong non-ionic negative group and being of non-hygroscopic and non-water-soluble nature and being stable against decomposition of themselves and upon contact with surfaces to be lubricated and with meteorological agents; said lubricant having a positive contact angle with steel and jewel surfaces in excess of 10 degrees, a melting point below minus 35 degrees C., a low vapor tension at temperatures below 100 degrees C., a low viscosity within said temperature range, a coefficient of friction below 0.1040 when used in a bearing of steel on sapphire, and a substantially flat viscosity-temperature curve from minus 35 degrees C. to plus 100 degrees C.

14. A non-spreading lubricant consisting essentially of a mixture of stable polar aralkyl compounds in each of which the molecules comprise an alkyl chain and a nuclear aromatic radical connected to said chain, said molecules each having strong non-ionic negative groups, said lubricant having a positive contact angle with a steel surface in excess of 10 degrees and having a surface tension of at least 35 dynes per centimeter.

15. A non-spreading lubricant consisting essentially of stable polar aralkyl hydrocarbon molecules each comprising a plurality of aromatic nuclei connected adjacent one end of an aliphatic chain of 3 to 24 carbon atoms, said molecules each having a strong non-ionic negative group, said lubricant having a positive contact angle with a steel surface in excess of 10 degrees and having a surface tension of at least 35 dynes per centimeter.

16. A non-spreading lubricant consisting essentially of stable polar aralkyl hydrocarbon having an aliphatic chain of at least 5 carbon atoms and including at least two aryl nuclei, at least one said nucleus being adjacent the end of the chain, said nuclei providing strong non-ionic negative groups, said lubricant having a positive contact angle with a steel surface in excess of 10 degrees and having a surface tension of at least 35 dynes per centimeter.

17. A non-spreading lubricant consisting in major part of phenoxyphenyl cetane, said lubricant having a positive contact angle with a steel surface in excess of 10 degrees.

18. A non-spreading lubricant consisting in major part of diphenylheneicosane, said lubricant having a positive contact angle with a steel surface in excess of 10 degrees.

19. A non-spreading lubricant consisting essentially of stable aralkyl molecules including a water-type oxy aralkyl compound, said lubricant having a positive contact angle with a steel surface in excess of 10 degrees, and a corrosion inhibitor.

20. A non-spreading lubricant consisting essentially of phenyloctadecyl phenylvalerate, said lubricant having a positive contact angle with a steel surface in excess of 10 degrees.

21. A non-spreading lubricant consisting in major part of diphenylheneicosanone, said lubricant having a positive contact angle with a steel surface in excess of 10 degrees.

GEORGE E. BARKER.